June 16, 1936.  A. E. RUTTER  2,044,718
PLOW
Filed April 5, 1935  2 Sheets-Sheet 1
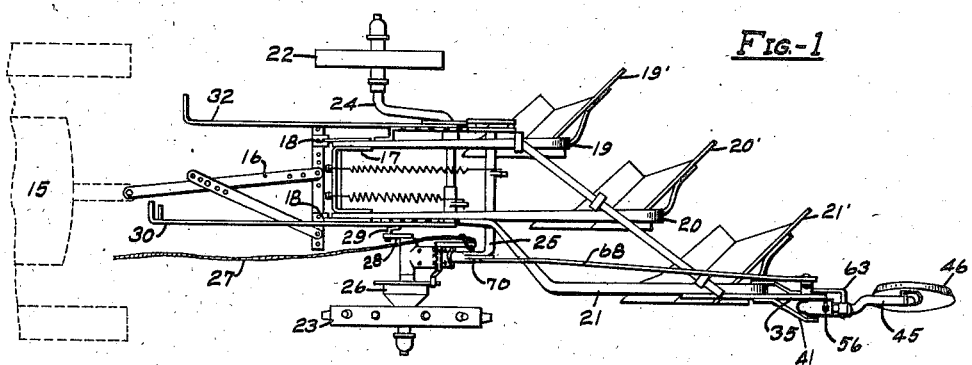
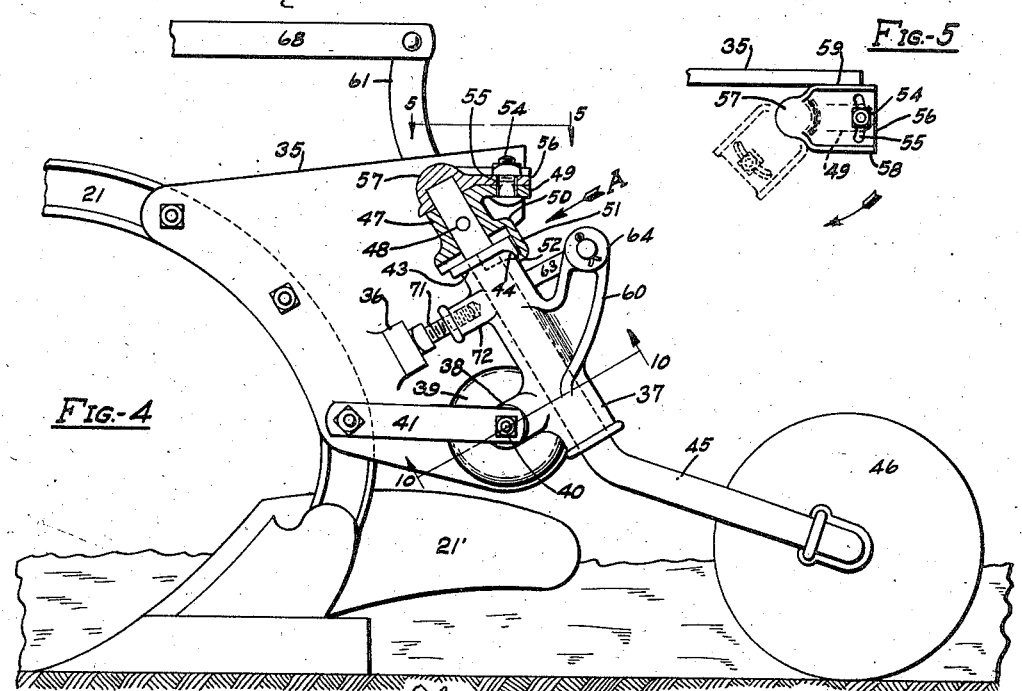
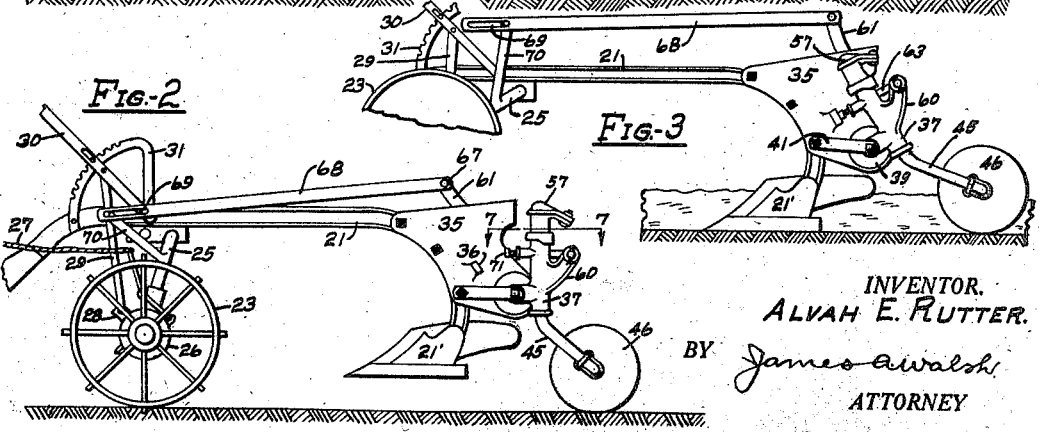
INVENTOR.
ALVAH E. RUTTER.
BY James A. Walsh
ATTORNEY

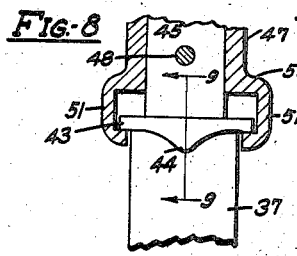
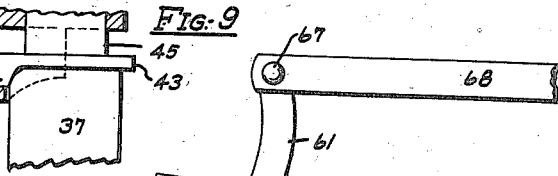
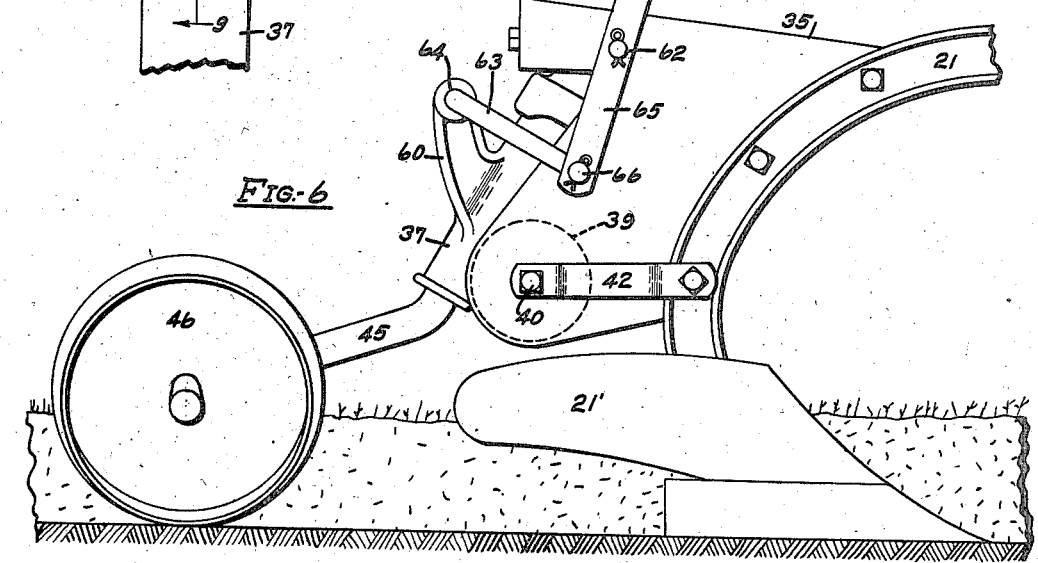
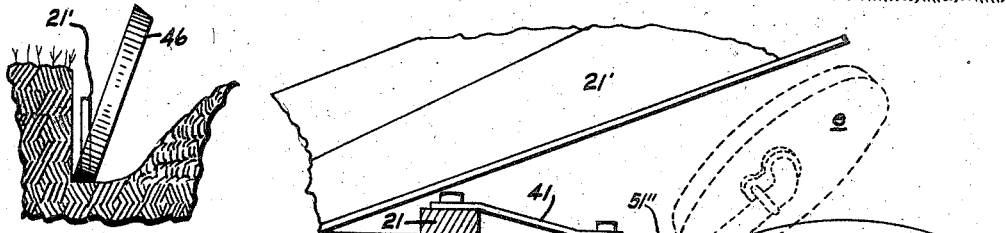
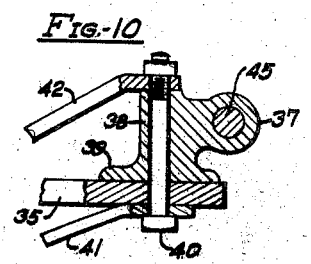

Patented June 16, 1936

2,044,718

UNITED STATES PATENT OFFICE 2,044,718

PLOW

Alvah E. Rutter, Rockford, Ill., assignor to J. I. Case Company, Racine, Wis., a corporation Application April 5, 1935, Serial No. 14,739

10 Claims. (Cl. 97—127)

This invention relates to wheeled plows, and more particularly to the type of plow employing a trailing caster-wheel which supports the rear end of the plow frame at the desired varied elevations above the ground when the plow bottoms are in operation and during the transportation of the implement from or to the field.

An object of this invention is to provide improved means for attaching the caster-wheel and associated parts, as a unit, to the rearmost plow-beam; another object is to provide means whereby the caster-wheel may be readily adjusted to provide landside clearance for the plows and also including means whereby the wheel is free to caster in one direction only when the plow bottoms are in working position; a further object is to provide means whereby the front end of the plow bottoms will be caused to begin to rise out of the ground before the caster-wheel starts to raise the rear end of the frame, these means being automatic in operation; and other objects and advantages will be fully disclosed in the following specification.

In the accompanying drawings, forming part hereof, Figure 1 is a plan view of a wheeled plow embodying my improvements; Fig. 2 a side elevation showing the plow in transport position; Fig. 3, a fragmentary side elevation showing the plows in working position; Fig. 4, an enlarged left-hand side view of the caster-wheel attached to a plow-beam by my improved method; Fig. 5, a partial plan view showing adjusting means for the caster-wheel, taken on lines 5—5, in Fig. 4; Fig. 6, an enlarged view similar to Fig. 4 taken from the right-hand side; Fig. 7, a semi-sectional plan view taken on the dotted line 7—7 in Fig. 2; Fig. 8, a partial sectional view taken in the direction of arrow A in Fig. 4, showing the method of supporting the weight of the plow about its spindle sleeve-bearing; Fig. 9, a detail taken on lines 9—9 in Fig. 8; Fig. 10, a sectional view taken on lines 10—10 in Fig. 4 showing the pivotal connection of the caster-wheel spindle bearing to the bracket plates; and Fig. 11 is a diagrammatic view showing the relative position of the caster-wheel, land-side of the plow bottom and the furrow when the plow is in working position.

In said drawings the numeral 15 indicates a tractor with which this type of plow is generally used, being attached thereto by a drawbar system 16 which is pivotally connected to the plow frame 17, as at 18. A series of plow beams 19, 20 and 21 arranged as shown forms a part of the frame structure, each beam having a plow bottom 19', 20' and 21' respectively. The said frame structure is mounted upon a pair of forwardly located carrying wheels 22, 23, by crank axles 24 and 25 respectively, the latter axle and wheel 23 being associated with an intermittent clutch 26 of well known construction and operation and controlled by a rope 27 within reach of an operator on the tractor. The clutch has an arm 28 connected to the plow frame by a suitable link 29 secured to and actuated by a lever 30 and quadrant 31 for adjusting the frame to elevate the plow bottoms. A similar quadrant and lever 32 are used for leveling the plow in rough fields or on hillsides.

To the rear downwardly curved portion of beam 21 carrying the rearmost plow bottom 21' is rigidly bolted a bracket 35 extending rearwardly parallel with the beam 21 and having integrally formed therewith a stop 36, as clearly shown in Fig. 4. Pivotally mounted upon said bracket is a sleeve bearing 37, integral with which and disposed at right angles thereto being a pivot bearing 38 embodying a surface plate 39, the said bearing 38 and plate constituting a bearing for a bolt or pin 40 which passes through braces 41, 42, bracket 35 and said bearing 38, as shown in Fig. 10. At the upper end of bearing 37 is a circumferential outwardly projecting flange 43 including a lip 44 extending downwardly in relation to the rear side of sleeve 37, Fig. 8.

A bent spindle or shaft 45, carried by the caster-wheel 46, passes upwardly through and is rotatable in the bearing 37, the upper end of said spindle having a sleeve 47 secured thereto by a pin 48 or otherwise. The said sleeve 47 embodies an arm 49 and a collar 50, the latter having a circumferential downward wall 51 terminating in an inwardly projecting segmental ring or detent 52 which partially embraces the outward flange 43 of bearing 37, Figs. 4 and 9, and which detent is located toward the rear side of wall 51 for receiving and yieldingly holding the lip 44 when the caster-wheel is trailing directly behind the plow bottoms.

A bolt 54, passing through the arm 49 and a slotted hole 55 in extension 56 of a cap 57 which is pivotally mounted on the upper end of spindle 45, adjustably fastens the said spindle to the said cap, the cap extension having walls 58 and 59, the latter of which lies parallel with the bracket 35 for a purpose to appear.

The caster-wheel mechanism is operatively associated with the carrying wheels by a linkage arrangement as shown in Fig. 6 comprising an arm 60 preferably formed integrally with the bearing 37, the arm being attached to a lever 61, fulcrumed about a stud, as at 62, by a link 63 connecting the upper end of arm 60, at 64, to the lower end 65 of lever 61, at 66. The lever 61 is pivotally attached at 67 to a forwardly extending rod, or link 68, which terminates in a slotted end 69 associated with the upper end of an arm 70 welded or otherwise secured to the crank axle 25, as in Fig. 2, the actuation of which link will operate the mechanism associated with the caster wheel.

The relative position of the lower edge of the plow bottom and lower edge of the caster-wheel is controlled by the stop adjusting bolt 71, the head of which abuts stop 36 and its threaded stem is screwed into a forwardly projecting boss 72 of the sleeve 37, the purpose and operation of which will further appear.

Describing next the operation of this invention, it will be understood that Figs. 3, 4 and 6 show the plow in working position. Through the well known principle of clutch 26, Figs. 1 and 2, the plow bottoms are caused to be lowered from the position shown in Fig. 2 to that shown in Fig. 3 by the operator manipulating rope 27 which causes the clutch to function to swing the plow frame about axles 24 and 25, and simultaneously causing the end of arm 70 to move rearwardly and thereby removing tension on links 68, which action permits the lever 61 to fulcrum so that the upper end of sleeve 37, and associated parts, will pivot forwardly, Fig. 4, about bolt 40 until the head of adjusting bolt 71 abuts stop 36, and as the plow is being pulled across the field the plow bottoms will consequently penetrate to the desired depth as adjusted by levers 30 and 32.

As a plow traverses the field, obstructions are frequently met in the form of hidden roots and large stones which impede the forward movement of the plow bottoms, and consequently the obstructions must be removed or the plow backed and guided around the same, which maneuvering becomes difficult in operating plows commonly used due to the arrangement of the caster-wheel. As my improved plow is caused to move rearwardly, the spindle 45 of caster-wheel 46 will tend to move in a clockwise direction, as shown in Fig. 7, as the spindle sleeve 37 is located as shown in offset relation to the bracket 35. When the plow has been moved rearwardly a short distance the wheel 46 will be in position *a* and against the land-side of the furrow as indicated by the dotted lines. As the plow continues in its rearward movement the wheel will pass through the various positions *b*, *c*, and finally *d*, always being against the landside of the furrow, when the end 51' of the segmental wall 51 will abut a stop 74 integrally formed with the circumferential outwardly projecting flange 43 of sleeve 37 at the position shown in Fig. 7. This stop determines the maximum clockwise rotation of the caster-wheel assembly to prevent it from coming in contact with the plow elements. Simultaneously, while the caster-wheel is turning as described, the plow is being moved away from the landside of the furrow, leaving such landside in undamaged condition, but which movement in the use of plows well known leaves the landside in broken and damaged condition. During transportation of the plow, as shown in Fig. 2, the stop 74 functions as a safety means if the plow is turned sharply to the right which will cause the caster-wheel to assume the position shown by dotted lines *e*, Fig. 7, causing the edge 51" of wall 51 to abut said stop, and continued sharp turning will force the wheel to drag sidewise instead of contacting the plow bottom and causing damage thereto.

A novel adjustment is provided for controlling the landside clearance of the rear end of the plow as diagrammatically shown in Fig. 11. When it is desired to change this clearance, bolt 54 is loosened and arm 49 is moved according to the clearance required, when bolt 54 is again securely tightened, thereby locking arm 49 to the extension 56 of cap 57. When the plow is in operation the wall 59 is in direct contact with the bracket 35 as in Fig. 5, thereby causing the thrust of the caster-wheel against the edge of the furrow to be carried against the side of said bracket through the axle 45, sleeve 47 and cap extension 56, and as the wall 59 cannot turn counterclockwise against the bracket 35, it is evident the caster-wheel cannot be thrust away from the furrow wall.

During transportation of a plow of this type, difficulty is frequently encountered by vibration of the caster-wheel, which condition imposes undue stresses upon the frame elements and is at the same time troublesome to the operator. In the construction herein disclosed the weight of the rear end of the plow is carried by the flange 43 of sleeve 37 engaging the segmental wall 51 of sleeve 47 which, as stated, is fastened to spindle axle 45, which tends to move sleeve 47 upwardly away from sleeve 37, urging lip 44 into detent 52 when the plow is moving in a straight line. As the weight of the rear end of the plow is carried by the lip 44 in the said detent, the axle 45 will tend to remain in a fixed position until sufficient force is applied by the caster-wheel (when the plow is turning) to cause the sleeve 47 to rotate, forcing ring 51 under lip 44, thereby removing the detent from engagement with said lip and permitting the axle to turn freely until it is again caused to trail directly behind the plow, when lip 44 will again engage detent 52 and be in a steady trailing position.

In the operation of my improved plow, when elevating it from working position to transport position, the operator pulls on rope 27, causing clutch 26 to function so as to elevate the plow frame through the link system 68, 61, as shown, whereupon the end of arm 70, Fig. 3, will move forwardly a predetermined distance in slot 69 without affecting link 68. This movement causes the forward end of the plow frame to be slightly elevated before the rear end, consequently the lower edge of the plow bottoms will be upwardly inclined with the result that they will cut their way upwardly through the ground as the plow moves forwardly. After the end of arm 70 has moved the length of the slot it will pull on link 68 causing the rear end of the plow to become elevated, as described hereinbefore, through the caster-wheel mechanism.

In assembling the caster-wheel spindle and associated parts with bracket 35, as disclosed, it will be understood that the structure is of a unitary character, readily attachable to beam 21 by bolting, and which unit may be installed and removed at will.

I claim as my invention:

1. In an implement of the class described, a beam having a plow bottom thereon, a unitary caster-wheel support comprising a bracket adapted to be detachably secured to the beam, a bearing pivotally mounted on the bracket, a spindle swivelingly mounted in the bearing, a sleeve embodying an arm connected to and through which the spindle extends, a cap on the spindle having an extension, and means connecting said extension and the arm to adjustably maintain the spindle, sleeve, and cap in fixed relation to each other, a stop portion on said cap arranged to contact said bracket and prevent rotation of said sleeve and spindle in one direction when the plow is lowered and whereby the arm may be adjusted for controlling the landside clearance of the rear end of the implement.

2. In an implement of the class described, a beam having a plow bottom thereon, a bracket detachably secured to the beam, a spindle bearing having a laterally extending pivot bearing, said spindle bearing having a flange at its upper end including a downwardly extending lip, means connecting the laterally extending bearing to the bracket for pivotally mounting the spindle bearing on the latter, a spindle extending through the bearing, a sleeve secured to the spindle including an arm at its upper end and a collar at its lower end adapted to embrace the flange on said spindle bearing, a cap on the spindle embodying a slotted extension, and means connecting the arm and extension to adjustably maintain the spindle, sleeve and cap in fixed relation with each other, a stop portion on said cap arranged to contact said bracket and prevent rotation of said sleeve and spindle in one direction when the plow is lowered and whereby said arm may be adjusted for controlling landside clearance of the rear end of the implement.

3. In an implement of the class described, a beam having a plow bottom thereon, a bracket on the beam, a spindle bearing pivotally mounted on the bracket and having a flange at its upper end including a lip, a wheeled spindle extending through said bearing, a sleeve secured to the spindle having a rearwardly extending arm and a downwardly extending collar including a detent adapted to engage said lip, a cap on the spindle having a member extending rearwardly in relation to said arm, means connecting said member and the arm to adjustably maintain the spindle, sleeve and cap in fixed relation to each other, a stop portion on said cap arranged to contact said bracket and prevent rotation of said sleeve and spindle in one direction when the plow is lowered, power-lift mechanism on the implement, and means connecting the spindle bearing and engaging and actuated by said mechanism for swinging the spindle bearing to vertically adjust the plow beam.

4. In an implement of the class described, a beam having a plow bottom thereon, a wheeled axle supporting the beam, a swinging arm on the axle, a bracket on the beam having a stop thereon, a bearing pivotally mounted on the bracket including means for engaging said stop, a spindle swivelingly mounted in the bearing and having a wheel at its lower end, a sleeve secured to the spindle having a rearwardly extending arm and a downwardly extending collar including a detent adapted to engage the bearing, a cap on the spindle having a member extending rearwardly in relation to said arm, means connecting said member and the arm to adjustably maintain the spindle, sleeve and cap in fixed relation, a stop portion on said cap arranged to contact said bracket and prevent rotation of said spindle in one direction when said plow is lowered, slotted means slidably engaging said swinging arm, means pivotally mounted on the bracket and connecting the latter with the slotted means, and power-lift mechanism on the plow connected to the arm for reciprocating the slotted means to actuate the connecting means to adjust the bracket and associated parts into earth working and transport positions.

5. In an implement of the class described, a beam having a plow bottom thereon, a unitary caster-wheel support comprising a bracket adapted to be detachably secured to the beam, a bearing pivotally mounted on the bracket, a spindle swivelingly mounted in the bearing, a member fixed with said spindle and having a rearwardly extending arm, and an extension member adjustably fixed with said arm and having a portion arranged to contact said bracket and prevent movement of said arm, and accordingly rotation of said spindle in one direction, and whereby adjustment of said extension member may be utilized to determine a position of said arm for controlling the landside clearance of the rear end of the implement.

6. In an implement of the class described, a beam having a plow bottom thereon, a bracket secured to the beam, a spindle bearing movably secured to the bracket, a spindle in said spindle bearing, a caster-wheel carried by said spindle, said spindle being arranged to swivel in said bearing to accommodate changes in the direction of movement of said implement, a member fixed with said spindle and having a rearwardly extending arm, a portion on said arm arranged to contact said bracket and prevent movement of said arm, and accordingly rotation of said spindle in one direction, when said bearing is in position for plowing, but being free of said bracket when said bearing is in position for transportation, power-lift mechanism on the implement, and means connecting the spindle bearing and engaging and actuated by said mechanism for moving the spindle bearing from one position to the other.

7. In an implement of the class described, a beam having a plow bottom thereon, a bracket secured to the beam, a spindle bearing member secured to the bracket, a spindle member in said spindle bearing, a caster-wheel carried by said spindle member, said spindle member being arranged to swivel in said bearing member to accommodate changes in the direction of movement of said implement, and also arranged for longitudinal movement in said bearing member, and means for yieldingly holding said spindle member in one position including a lip on one member and a notched flange on the other member, said lip engaging the notch of said flange in said one position, said lip and flange being forced apart with longitudinal relative movement between said spindle and bearing in the event of the development of a sufficiently strong turning effort in said spindle, for castering action of said caster-wheel.

8. In an implement of the class described, a beam having a plow bottom thereon, a bracket secured to the beam, a spindle bearing secured to said bracket, a spindle in said spindle bearing, a caster-wheel carried by said spindle, said spindle being arranged to swivel in said bearing member to accommodate changes in the direction of movement of said implement, and also arranged for longitudinal movement in said bearing, and means for yieldingly holding said spindle in a position corresponding to straight trailing movement of said implement including interengaging cam elements, said elements being urged together by longitudinal relative movement of said spindle and bearing induced by the weight of said implement.

9. In an implement of the class described, a beam having a plow bottom thereon, a bracket secured to the beam, a spindle bearing movably secured to the bracket, a spindle in said spindle bearing, a caster wheel carried by said spindle, said spindle being arranged to swivel in said bearing to accommodate changes in the direction of movement of said implement, a member fixed with said spindle and having an arm extending therefrom, a portion on said arm arranged to contact a side of said bracket and prevent movement of said arm, and accordingly rotation of said spindle in one direction, when said bearing is in position for plowing, but being free of said bracket when said bearing is in position for transportation, power-lift mechanism on the implement, and means connecting the spindle bearing and engaging and actuated by said mechanism for moving the spindle bearing from one position to the other.

10. In an implement of the class described, a beam having a plow bottom thereon, a bracket secured to the beam, a spindle bearing movably secured to the bracket, a spindle in said spindle bearing, a caster wheel carried by said spindle, said spindle being arranged to swivel in said bearing to accommodate changes in the direction of movement of said implement, a member fixed with said spindle and having an arm extending therefrom carrying a portion arranged to contact a side of said bracket and prevent movement of said arm, and accordingly rotation of said spindle in one direction, but to move away from said bracket and permit rotation of said spindle in the other direction when said bearing is in position for plowing, said arm being entirely free of said bracket when said bearing is in position for transportation, and mechanism on said implement arranged for moving the spindle bearing from one position to the other.

ALVAH E. RUTTER.